Jan. 23, 1951        B. H. FOSTER        2,539,301
WOVEN GLASS FABRIC AND METHOD OF MAKING SAME
Filed July 15, 1949
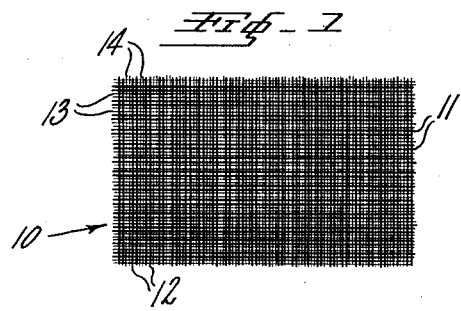
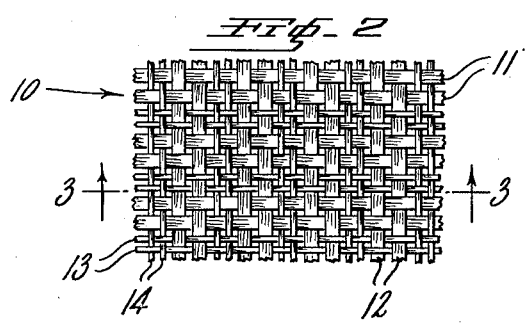
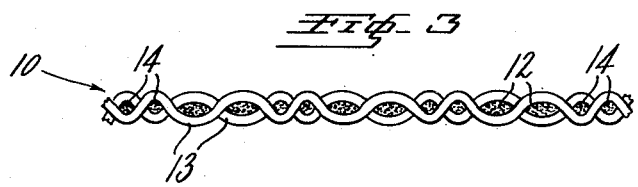
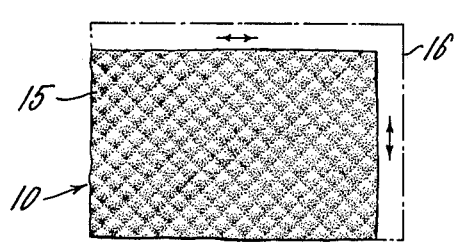
INVENTOR.
BOUTWELL H. FOSTER
BY
Charles C. Willson
ATTORNEY Patented Jan. 23, 1951

2,539,301

UNITED STATES PATENT OFFICE 2,539,301

WOVEN GLASS FABRIC AND METHOD OF MAKING SAME

Boutwell H. Foster, Maplewood, N. J., assignor to United States Rubber Company, New York, N. Y., a corporation of New Jersey Application July 15, 1949, Serial No. 104,960

8 Claims. (Cl. 28—73)

This invention relates to woven glass fabric, and particularly to a woven glass fabric having a substantial range of stretch, and to a method of making the same.

Woven glass fabric has a number of highly desirable properties, in that it is very strong and because of its chemical inertness it is highly resistant to the effects of sunlight, air oxidation, aging and mildew. Also it is non-inflammable and is capable of giving long wear. However, one serious difficulty with woven glass fabric for uses in many fields is due to its very low elastic properties which prevent it from being stretched sufficiently to conform to curved surfaces that it may be desired to cover.

For example, woven glass fabric when treated with a coating material that will cover and protect the individual glass threads and keep them from slipping in the fabric might well be used for upholstery material such as covers for cushions and automobile seats and as a cover for folding baby carriage tops and the tops of convertible automobiles, were it not for the fact that the low stretch properties of such woven glass fabric prevent it from comforming well to rounded surfaces. This lack of stretch causes the fabric to wrinkle or fold when it is fitted to a curved surface, and if glass fabric is folded sharply it will split or tear.

Having in mind the foregoing the present invention contemplates a woven glass fabric which is so constructed that it may be stretched sufficiently to cause it to conform readily to various curved surfaces, such as those likely to be encountered when such fabric is used in the upholstery field or as a covering material for the folding tops of vehicles, and in other fields where a small amount of stretch is needed.

In carrying out the present invention glass fiber threads such as have been employed heretofore for weaving strong durable glass fabric may be employed, but instead of making such fabric entirely of glass fiber threads as heretofore, the present invention contemplates interweaving the glass fiber threads with heat-shrinkable thermoplastic yarns, so that after the fabric thus produced comes off the loom it can be heated sufficiently to cause the thermoplastic yarns to shrink so that they will contract the woven glass fabric, say anywhere from 5 to 20% as desired. It is important that the heat applied to such fabric shall not melt the thermoplastic yarns but serve to shrink them and render them elastic so that they will contract the woven glass fabric and yieldingly hold it contracted.

Woven glass fabric when given the desired range of stretch, in accordance with the present invention, and provided with a tough durable coating film that will cover and protect the glass threads of the woven fabric and keep them from slipping in the fabric, produces a strong durable covering fabric that is well adapted for use in a number of fields, and because of its ability to stretch it can be fitted smoothly around curved surfaces.

In carrying out a preferred method of the present invention the following steps are employed.

(1) Weave a fabric of glass fiber threads and a smaller percent by weight of heat-shrinkable thermoplastic yarns. The weave employed may be varied extensively to vary the appearance or other properties of the finished fabric, and also to produce a one-way stretch or two-way stretch fabric as desired. The percentage of shrinkable yarn employed in the fabric will depend upon the amount of contraction it is desired to impart to the woven glass fabric and also to the strength of the contracting force it is desired to impart to such fabric. (2) After the fabric comes off the loom it is placed under sufficient tension to hold it taut and free of wrinkles, and while in this condition it is coated on one or both faces with a tough protecting film of any desired color. This coating material should be selected with care so that it will bond firmly to glass threads and will possess sufficient flexibility or elasticity to accommodate the stretch of the glass fabric, and will meet the other specific requirements needed for the use to which the glass fabric is to be put. (3) After the coating just mentioned has been applied to one or both faces to the glass fabric and preferably before the coating is dried or cured, tension on the fabric is released to allow the thermoplastic yarns to contract or condense the fabric to give it stretch properties. The thermoplastic yarns and coating are both stretchable so that under a load they can be stretched to the extent the fabric was condensed.

This completes a preferred method of producing a woven glass fabric having one or both faces protected by a film of coating material and having a substantial range of stretch so that it may be fitted smoothly around curved surfaces. It is desired to point out however that the heating of the fabric to shrink the yarns may be carried out before or after the coating film is applied.

It is important that the heat-shrinkable resinous yarn employed in carrying out the present invention shall possess the property known as "elastic memory"; that is the yarn used should be a thermoplastic yarn which during its course of manufacture was subjected to a pronounced drawing or stretching operation at an elevated temperature and then cooled so that thereafter it will not contract at normal atmospheric temperatures, but if again heated to the approximate temperature at which it was drawn or stretched, it will contract and display good elastic properties. The elastic properties such a yarn displays will cause it to have a stretch range far below the stretch range of the ordinary rubber thread, but on the other hand at elevated temperatures its contractive force will be many times that of the contractive force of a rubber thread of the same size. Furthermore it is possible to control accurately the elastic range of such heat-shrinkable yarn by selecting a yarn that will contract a definite percent under a definite heat treatment.

A heat-shrinkable yarn possessing elastic memory and which after being heat-shrunken in the fabric is capable of stretching and contracting somewhere around 25 to 50% with a strong contractive force, will impart the desired stretch characteristics to the woven glass fabric contemplated by the present invention, having in mind that what is desired is not a fabric that will stretch 100 percent or more like ordinary elastic webbing used in wearing apparel, but a fabric which when subjected to a strong pulling force will stretch somewhere around 10% to conform accurately to a rounded surface, such as the corner of a cushion or a rounded piece of furniture being upholstered.

The above and other features of the present invention will be further understood from the following description when read in connection with the accompanying drawing; wherein Fig. 1 is a face view of a piece of fabric woven in accordance with the present invention, as it comes off of the loom;

Fig. 2, on a larger scale, is a face view of portion of the fabric shown in Fig. 1;

Fig. 3, on a still larger scale, is a sectional view taken on the line 3—3 of Fig. 2; and Fig. 4 is a face view of the coated and stretchable glass fabric contemplated by the present invention.

Referring to the drawing, the potentially stretchable woven glass fabric 10, which will stretch after it is contracted by heat treatment, shown in the drawing, is a two-way stretch fabric and embodies in both the warp and weft thereof glass fiber threads and smaller heat-shrinkable thermoplastic yarns. These threads are shown as the glass fiber warp threads 11 and similar weft threads 12 and have interwoven therewith the heat-shrinkable thermoplastic warp yarns 13 and similar weft yarns 14. The weave employed may be varied extensively and that shown in the drawing is a simple square weave in which the glass fiber threads 11 and 12 are arranged in pairs and the smaller heat-shrinkable yarns 13 and 14 are arranged in pairs. The use of such yarns in pairs is desirable as it produces a balanced weave and reduces the tendency of the fabric to buckle or distort when it is contracted in the manner to be described. In any construction used the heat-shrinkable yarns should repeat at certain intervals.

The sectional line 3—3 shown on Fig. 2 of the drawing is so placed that two of the serpentine warp yarns 13 appear side by side in Fig. 3, and it will be noted that one of these warp yarns 13 engages one side of each of the wefts 12 and 14 whereas the other warp yarn 13 engages the opposite side of such wefts. It is assumed that the warps and wefts so far described have a relatively low twist, which permits the yarns and threads to flatten out somewhat in the weave as indicated by the eliptical shape of the threads 12 shown in Fig. 3.

The glass fiber threads 11 and 12 may be as coarse or as fine as desired depending upon the properties desired in the finished stretchable woven glass fabric, and any well-known continuous-filament glass fiber threads may be used as the warp threads 11 and weft threads 12. The heat-shrinkable yarns 13 and 14 must be carefully selected so that they will impart the desired stretch properties to the woven fabric after it has been subjected to the proper amount of heat. These yarns are preferably much smaller than the fiber glass threads as shown in the drawing and they may be monofilament or multiple filament yarns. These heat-shrinkable yarns are synthetic organic thermoplastic yarns which are oriented and have elastic memory, and are capable of marked shrinkage at an elevated temperature while retaining their elasticity to a considerable degree.

Some of the yarns which may be employed as the heat-shrinkable yarns used in the fabric 10 are Vinyon (a copolymer of vinyl chloride and vinyl acetate), nylon (a high molecular weight linear polyamide), and Saran (a copolymer of vinyl chloride and vinylidene chloride). Vinyon and nylon appear to be particularly well adapted for applicant's purpose, and the heat-shrinkable yarns used in a fabric should be sufficiently heavy or close together to supply the desired contractive force.

One good practical example of a fabric such as indicated by 10 in the drawing, as this fabric comes off the loom is given in the following tables:

TABLE I

| | |
|---|---|
| Glass (450 cut 3/2 [1]) warps per inch | 26 |
| Glass (450 cut 3/2 [1]) wefts per inch | 22½ |
| Vinyon N (200 den.) warp per inch | 26 |
| Vinyon N (200 den.) wefts per inch | 22½ |
| Gauge of fabric (when tensioned) inch | .0087 |
| Weight/sq. yd. (about) ounces | 5.46 |
| Strength of warp (1″ grab test) pounds | 189 |
| Strength of weft (1″ grab test) do | 190 |
| Stretch at break (warpwise) per cent | 10.4 |
| Stretch at break (weftwise) do | 11.1 |
| Glass in fabric do | 75.7 |
| Vinyon in fabric do | 25.3 |

[1] 450 cut 3/2 means that 3 ends of 450 cut untwisted yarns are brought together, and then two of these 450 cut three-end yarns are plied together; the expression 450 cut means 45,000 yards to the pound.

TABLE II

Shrinkage properties of fabric of table I [2]

| Off the Loom | Boiled | Oven 400° F. |
|---|---|---|
| Weight/sq. yd., 5.46 ozs. | 7.5 ozs. | 9.9 ozs. |
| Warp crimp glass, 6.2% | 20.0% | 25.0 (est.). |
| Warp crimp Vinyon, 6.2% | 10% | 12.5 (est.). |
| Weft crimp glass, 5.6% | 25.0% | 29.0 (est.). |
| Weft crimp Vinyon, 6.2% | 10.0% | 12.5 (est.). |
| Warp shrinkage | 15.3% | 20.8%. |
| Weft shrinkage | 20.8% | 25.0%. |

[2] Fabric uncoated and free of tension.

It will be seen from Table II that after the fabric has been shrunken by boiling in water or heated very briefly in a hot oven, the crimp of the glass yarns will be about twice that of the Vinyon yarns in the fabric, so that the fabric may be stretched the amount permitted by the glass yarns.

In accordance with one good practical method of carrying out the present invention the fabric 10 is woven as above described. Then the fabric after it comes off the loom is stretched sufficiently to hold it smooth and free from wrinkles, and while advanced in this condition it is coated with a tough, durable coating film which is sprayed or otherwise applied to one or both faces of the fabric to form the film 15. The coating film applied to one face may be the same or a different color from that applied to the opposite face. This coating material should be carefully selected so that it will bond firmly to the glass fiber threads at each face of the fabric, will give good service in that field in which the glass fabric is to be used, and will be sufficiently flexible to allow the fabric to stretch and contract without causing the coating to crack. After the coating is applied the freshly coated fabric is preferably passed through a heating chamber so as to speed up the drying or setting of the coating film, and the heat applied to dry or set the film may be at such a temperature that it will cause the heat-shrinkable yarns to contract and render them elastic, but at this time the fabric should be sufficiently free from tension to allow it to contract under the shrinking action of the heat-shrinkable yarns.

One good practical coating compound that will bond well to glass threads, is tough and durable and has good flexing properties, is a properly compounded and plasticized copolymer of a major proportion of a vinyl chloride and a minor proportion of vinyl acetate.

The amount of shrinkage imparted to the woven glass fabric in accordance with the present invention can be carefully controlled by selecting heat-shrinkable yarns which will shrink a known percentage on the application of a predetermined amount of heat. For example it is possible to purchase on the market one type of heat-shrinkable yarn that will shrink say 50% under a definite heat treatment, and another yarn which will shrink 25% under a definite heat treatment. Therefore by carefully selecting the heat-shrinkage yarns 13 and 14 used in the fabric 10 and by controlling the maximum temperature to which the fabric is subjected, it is possible to produce a woven glass fabric which when subjected to the proper heat treatment will be capable of stretching 5%, 10% or 15% as desired.

As a modified method of the present invention, the woven fabric 10 upon coming off of the loom may be heated while free from tension to contract the same by heat shrinking the yarns 13 and 14. It may then be coated by a coating material such as above described which is preferably applied while the fabric is held under sufficient tension to free it from puckers and wrinkles. This coating is then dried or set to form the protecting film 15.

After the coated stretchable glass fabric, such as shown in Fig. 4, has been produced by either method just described it will have a substantial range of stretch, as indicated by the dot and dash lines 16. It is an essential feature of the present invention that the contraction of the fabric above described be produced by the heat-shrunken yarns rather than by any elastic property of the coating 15, but the coating 15 should preferably be sufficiently elastic to yieldingly contract the fabric, so that it will act like a low stretch elastic fabric that can be stretched 10% or 15% under the pull of the hands.

Since the glass fiber threads 11 and 12 possess very little elasticity while the heat-shrinkable resinous yarns 13 and 14 possess an appreciable amount of elasticity at the time they are woven, and since all threads are normally subjected to some tension during the weaving operation, the small yarns 13 and 14 will be woven into the fabric under some tension and in a slightly stretched condition. As a result when the fabric is taken off of the loom these yarns may contract slightly while the glass fiber threads will not contract but will become more crimped. This may cause the uncoated and unshrunken fabric to have a slightly puckered appearance, but these puckers will disappear under slight tension.

As the yarns 13 and 14 shrink under the application of heat they tend to move inwardly towards the central plane of the fabric, while at the same time they impart to the larger non-elastic threads 11 and 12 an increased serpentine configuration. According to Table II the crimp of the glass threads is about twice as pronounced as that of the thermoplastic yarns. This causes the faces of the fabric to be formed practically entirely of the glass threads 11 and 12 which receive the coating film 15. When the contracted fabric is stretched the glass fiber threads 11 and 12 straighten out slightly and then limit the stretch of the fabric.

If the weave shown in Fig. 2 of the drawing is employed and thereafter the fabric is contracted as above described the coating film 15 applied thereto will, under the increased serpentine configuration imparted to the glass threads, tend to assume the appearance of slightly apparent diagonal rows as shown in Fig. 4. This imparts to the stretchable glass fabric of the present invention a distinct and pleasing surface appearance.

Having thus described my invention, what I claim and desire to protect by Letters Patent is:

1. A woven glass fabric formed predominantly of interwoven glass fiber threads but having interwoven therewith a smaller quantity of thermoplastic yarns that have a substantial extensibility, said yarns being woven in the fabric in at least one direction at spaced intervals and being heat-shrunken in the fabric to hold it yieldingly contracted so as to impart to the fabric the ability to stretch and contract approximately 10%, and a flexible coating film bonded to a face of the fabric.

2. A woven glass fabric that is stretchable longitudinally and transversely and formed of interwoven glass fiber warp and weft threads and having interwoven therewith at spaced intervals thermoplastic warp and weft yarns that have a substantial extensibility, said yarns being heat-shrunken in the fabric to hold it yieldingly contracted so as to impart thereto the ability to stretch and contract a substantial amount both longitudinally and transversely, and a flexible coating film bonded to a face of the fabric.

3. A woven glass fabric formed predominantly of interwoven glass fiber threads but having interwoven therewith a smaller quantity of thermoplastic yarns that have a substantial extensibility, said yarns being woven in the fabric in at least one direction at spaced intervals and being heat-shrunken in the fabric to hold it yieldingly contracted so as to impart to the fabric the ability to stretch and contract from 5 to 15%, and an extensible coating film bonded to a face of the fabric.

4. A woven glass fabric formed predominantly of interwoven glass fiber threads but having interwoven therewith in at least one direction a small quantity of thermoplastic yarns that have a substantial extensibility, said yarns being heat-shrunken in the fabric to hold the fabric yieldingly contracted so as to impart to the glass fabric the ability to stretch approximately 10% or more.

5. A woven glass fabric formed predominantly of interwoven glass fiber threads but having interwoven therewith in at least one direction a smaller quantity of thermoplastic yarns that have a substantial extensibility, said yarns being heat-shrunken in the fabric to impart to the glass threads a crimp that is about twice as pronounced as the crimp of the thermoplastic yarns and adapted to hold the fabric yieldingly contracted so that it has a substantial stretch.

6. The method of making a stretchable woven glass fabric, which consists in interweaving glass fiber warp and weft threads and a smaller quantity of heat-shrinkable thermoplastic yarns throughout the fabric, then applying a film of coating material to the fabric and heating the fabric sufficiently to shrink the organic thermoplastic yarns and thereby contract the fabric so that these yarns will normally hold the coated fabric contracted but capable of being stretched more than 5%.

7. The method of making a stretchable woven glass fabric, which consists in interweaving glass fiber warp and weft threads and a smaller quantity of heat-shrinkable thermoplastic yarns throughout the fabric, heating the fabric sufficiently to shrink the thermoplastic yarns and thereby contract the fabric so that these yarns will normally hold the fabric contracted but capable of being stretched more than 5%.

8. The method of making a stretchable woven glass fabric, which consists in interweaving glass fiber warp and weft threads and a smaller quantity of heat-shrinkable thermoplastic yarns throughout the fabric, then applying a film of coating material to the fabric and heating the fabric sufficiently to shrink the thermoplastic yarns and thereby contract the fabric so that these yarns will normally hold the coated fabric contracted but capable of being stretched approximately 10%.

BOUTWELL H. FOSTER.

REFERENCES CITED

The following references are of record in the file of this patent:

UNITED STATES PATENTS

| Number | Name | Date |
|---|---|---|
| 2,145,235 | Cryor | Jan. 31, 1939 |
| 2,161,766 | Rugeley et al. | June 6, 1939 |
| 2,204,859 | Hyatt et al. | June 18, 1940 |
| 2,381,061 | Kallmann | Aug. 7, 1945 |
| 2,384,936 | Lilley et al. | Sept. 18, 1945 |
| 2,448,782 | Davis | Sept. 7, 1948 |
| 2,450,948 | Foster | Oct. 12, 1948 |

FOREIGN PATENTS

| Number | Country | Date |
|---|---|---|
| 351,480 | Italy | Aug. 12, 1937 |